United States Patent [19]

Wildberger

[11] Patent Number: 5,003,489
[45] Date of Patent: Mar. 26, 1991

[54] TOTALIZER APPARATUS FOR FLOW RATE MEASUREMENT DEVICES

[75] Inventor: John Wildberger, Peterborough, Canada

[73] Assignee: Federal Industries Industrial Group Inc., Toronto, Canada

[21] Appl. No.: 395,517

[22] Filed: Aug. 18, 1989

[51] Int. Cl.$^5$ .................. G01F 1/00; G01G 11/00
[52] U.S. Cl. ..................... 364/510; 364/567; 364/570; 377/22; 340/606; 340/613; 73/861; 73/195
[58] Field of Search ............. 364/510, 570, 571.01, 364/567; 73/41, 41.4, 37, 861, 195, 202, 227; 340/603, 606, 608, 613; 377/22

[56] References Cited

U.S. PATENT DOCUMENTS

| | | | |
|---|---|---|---|
| 4,581,946 | 4/1986 | Kanayama | 364/510 |
| 4,593,365 | 6/1986 | Haley, Jr. et al. | 364/510 |
| 4,682,644 | 7/1987 | Kemp | 177/16 |
| 4,700,568 | 10/1987 | Sleffel | 364/510 |
| 4,829,449 | 5/1989 | Polesnak | 364/510 |
| 4,882,781 | 11/1989 | Allington | 364/510 |

OTHER PUBLICATIONS

Milltronics Specification Sheet 725, Revision 1, published Mar. 1988.

*Primary Examiner*—Parshotam S. Lall
*Assistant Examiner*—Brian M. Mattson
*Attorney, Agent, or Firm*—Ridout & Maybee

[57] ABSTRACT

A totalizer apparatus, used with belt scales and other flow rate measuring devices producing output signals subject to zero drift, maintains an auxiliary totalizer register during zeroing operations so that should zero flow conditions be interrupted during such an operation, a correct total can still be maintained. This enables autozeroing operations to be implemented, for which purpose a further auxiliary totalizer is used to test for an extended absence of flow before permitting initiation of an autozeroing operation. If a zeroing operation results in an apparently excessive zero correction, it is rejected and assumed that flow has restarted during the operation; the first auxiliary totalizer register is used to update a primary register.

10 Claims, 8 Drawing Sheets

TOTALIZER APPARATUS FOR FLOW RATE MEASUREMENT DEVICES

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to totalizer units for belt scales, flowmeters and other devices for measuring the bulk, mass or weight of material flowing or being conveyed past a fixed point at which the instantaneous loading on a suitable transducer or transducers is continuously sensed.

2. Review of the Art

Many such arrangements are already known. In general, a transducer or group of transducers is arranged to generate an electrical signal proportional to the instantaneous loading applied to an element which reacts to the flow of material, and this signal is multiplied by the speed of flow and integrated in order to produce an output corresponding to the quantity of material which has passed the element. In flowmeters, the apparatus may be arranged so that the speed of flow is constant, while in belt scales the speed of the belt is measured by a suitable sensor such as a pulse generating tachometer.

Processing of the transducer and tachometer signals is rendered more complex by the necessity of providing for zeroing of the transducer output. The zero load output of the transducer may shift, for example, due to changes in transducer characteristics because of material adhering to the conveyor belt in a belt scale or the sensor plate in a flowmeter, because of wear of the belt in a belt scale, or because of temperature or humidity variations. Any such zeroing in a belt scale must allow for the tare of the belt, which varies not only as the belt wears, but from point to point on the belt itself. The belt will usually be heavier in the immediate vicinity of a splice in the belt as well as having other irregularities. For this reason, zeroing of control and display units for belt scales is usually performed by monitoring output over one or more full revolutions of the belt through the system so as to find a setting which will produce an overall integrated output which is zero.

In apparatus which requires frequent zeroing, it is desirable to have this occur automatically without operator intervention. While various manufacturers have developed techniques for carrying out such zeroing automatically, automation of this feature presents problems which have prevented its widespread adoption.

Typically autozeroing is achieved by carrying out a zeroing cycle during periods when there is no flow through the apparatus. A problem with belt scales and to a lesser extent with flowmeters is that it is difficult to distinguish between a low rate of flow and no flow. A belt scale operating in conjunction with a belt having heavy and light sections will produce a varying transducer output even under no flow conditions.

Belt scale systems are also usually set up so that outputs corresponding to very low rates of flow, below a certain threshold, are disregarded. Any such threshold setting must be disabled prior to zeroing, since otherwise it will act so as to shift the zero setting. An autozeroing operation must also be scheduled so as not to interfere with normal operation of the apparatus when a load is present. Unfortunately, it is not possible for the apparatus to predict when a gap in the flow of material will occur which is long enough for the autozeroing function to be completed. If flow recommences while the zeroing function is in progress, both the function itself will be aborted, and material will pass through the system without being weighed. If a substantial lump of material temporarily sticks on a belt or flowmeter element, it may produce a temporary false zero which will cease to be valid as soon as the lump shifts.

SUMMARY OF THE INVENTION

An object of the present invention is to provide a control and display unit for belt scales and other devices for measuring rates of flow, which addresses the above problems.

According to the invention, there is provided apparatus for integrating a flow proportional signal, from a flow rate measuring device subject to zero drift, while the flow proportional signal, after application of a zero correction determined by a zeroing operation, exceeds a first predetermined threshold, the apparatus comprising:

means applying a zero correction to the flow proportional signal;

a first totalizer for accumulating the time integral of the zero corrected flow proportional signal while the threshold is exceeded; and means operative to redetermine a zero correction during a zeroing operation;

wherein said zero correction redetermining means further comprises; means disabling the first totalizer during the zeroing operation;

a second totalizer operative to accumulate the time integral of the zero corrected flow proportional signal during the zeroing operation;

threshold means to reject the redetermined zero correction determined during a zeroing operation if it deviates excessively from a reference; and means responsive to rejection of the redetermined zero correction by the threshold means to add the integral accumulated in the second totalizer during the zeroing operation to the first totalizer. The use of a second totalizer means that no totalizer error should occur if flow restarts during a zeroing operation, since the result of the zeroing operation will be rejected and the count of the second totalizer will compensate for counts lost by the first totalizer.

The apparatus preferably includes a third totalizer operative to accumulate a time integral of the flow proportional signal, timer means associated with the third totalizer, means to reset the third totalizer and the timer means on attainment of one of a predetermined total in the third totalizer and a predetermined elapsed interval timed by the timer, and means responsive to the predetermined time count being attained while the total is below a predetermined threshold to initiate the zeroing operation. This will assure that a zeroing operation is only initiated when there has been no flow for a sufficient interval that it is likely that the operation can be completed without flow recommencing.

Preferably also the apparatus comprises a register operative during a zeroing operation to accumulate samples of the flow proportional signal prior to zero correction, a second register to accumulate a count of the samples, further timer means to terminate the zeroing operation after a predetermined lapsed interval, and means to calculate a zero correction from the average value of the samples.

The flow rate measuring device is typically a belt conveyor weigh scale, but the apparatus may also be used with other types of flowmeters. For a belt scale, the time base of the timers is based on an integral number of belt revolutions so as to cancel the effect of light and heavy sections of the belt.

These and further features of the invention are described further with reference to the accompanying drawings.

SHORT DESCRIPTION OF THE DRAWINGS

Figure 1:
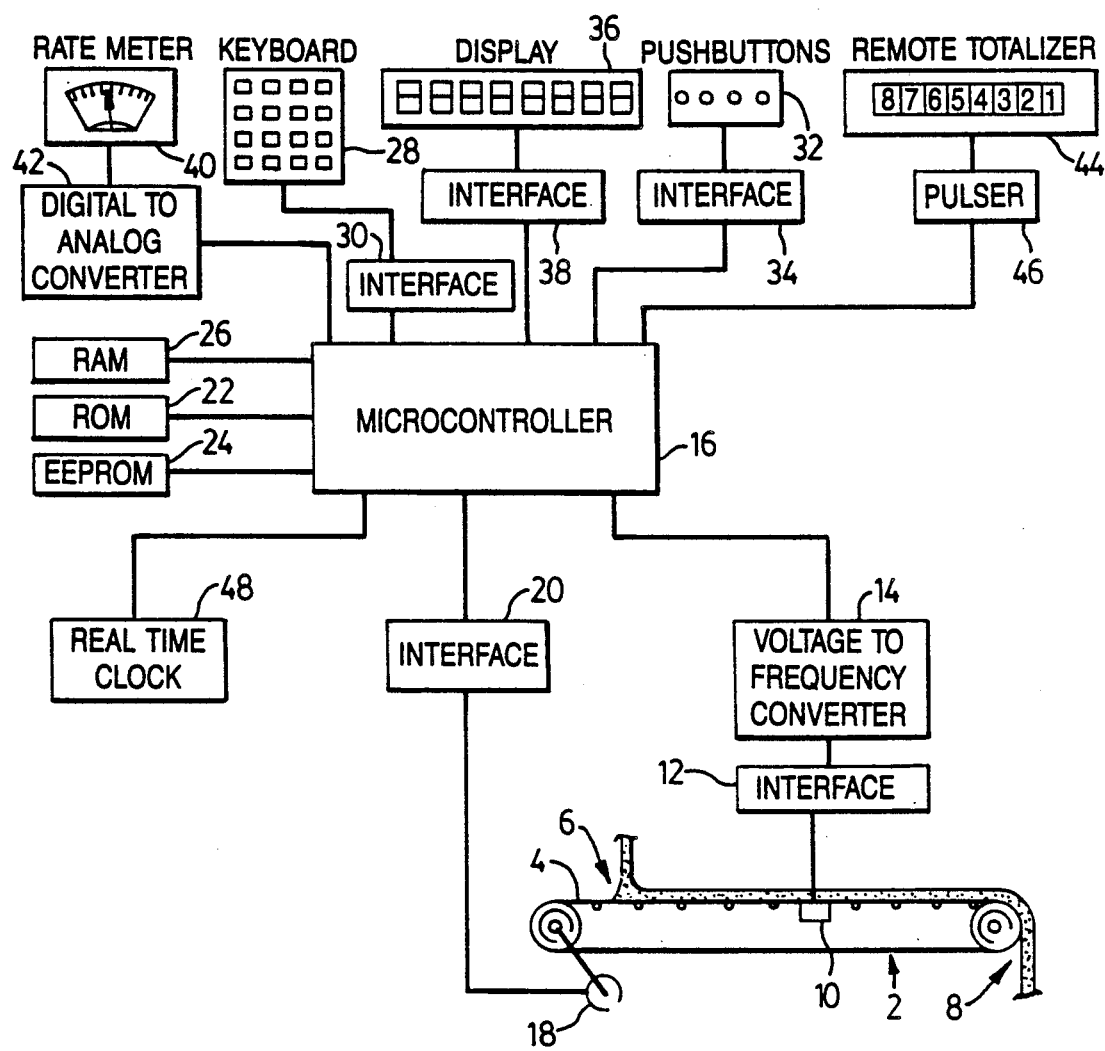
FIG. 1 is a schematic block diagram of apparatus in accordance with the invention, shown applied to a belt scale.

Referring to the drawings, FIG. 1 shows the general layout of apparatus according to the invention as applied to a belt scale. A conveyor 2 has a belt 4 which receives material at a point 6 and discharges it at a point 8. Between points 6 and 8 the belt passes across a belt scale unit 10 which contains one or more load cells which provide a signal continuously proportional to the load on a portion of the belt supported by means coupled to the load cells. A suitable form of belt scale unit is described in U.S. Pat. No. 4,682,664 issued July 28, 1987, to Charles W. Kemp, although use of the present invention does not require use of any particular belt scale unit provided that is capable of providing an output signal proportional to load. While the apparatus will be described as applied to a belt scale, it may also be employed with a flowmeter, in which case various functions associated with belt speed are omitted or substituted as discussed further below.

The signal from the unit 10 is applied through an interface 12 and a voltage-to-frequency converter 14 to a micro-controller 16, which in the example described was a 68HC11 micro-controller from Motorola. While other microcontrollers or microprocessors with suitable peripherals can be utilized, it should be understood that at least those portions of the exemplary program code included as an appendix (not re-printed; see application file) to this specification which are written in assembly language are specific to the 68HC11 unit although such portions could of course be translated into assembly language for other units of comparable capabilities. A pulse signal from a tachometer 18 driven by the belt is also applied through an interface 20 to the micro-controller 16.

The microcontroller is provided with memory comprising read only memory (ROM) 22 utilized to store an operating program and certain fixed data, nonvolatile memory (EEPROM) 24 utilized to retain data when the apparatus is powered down, particularly operator selectable parameters and cumulative data, and random access memory (RAM) 26 used to provide working memory and temporary storage of data during normal operation of the apparatus. The microcontroller receives further inputs from an operator through a keyboard 28 connected through an interface 30, and push buttons 32 connected through an interface 34. It typically provides outputs to an alphanumeric display 36 through a suitable interface 38, an analog rate meter 40 through a digital-to-analog converter 42, and a remote totalizer 44 through a pulsing device 46. The microcontroller is provided with a real time clock 48 generating real time interrupts at fixed intervals. According to the microcontroller used, this real time clock may be internally implemented in the microcontroller unit.

Figure 2:
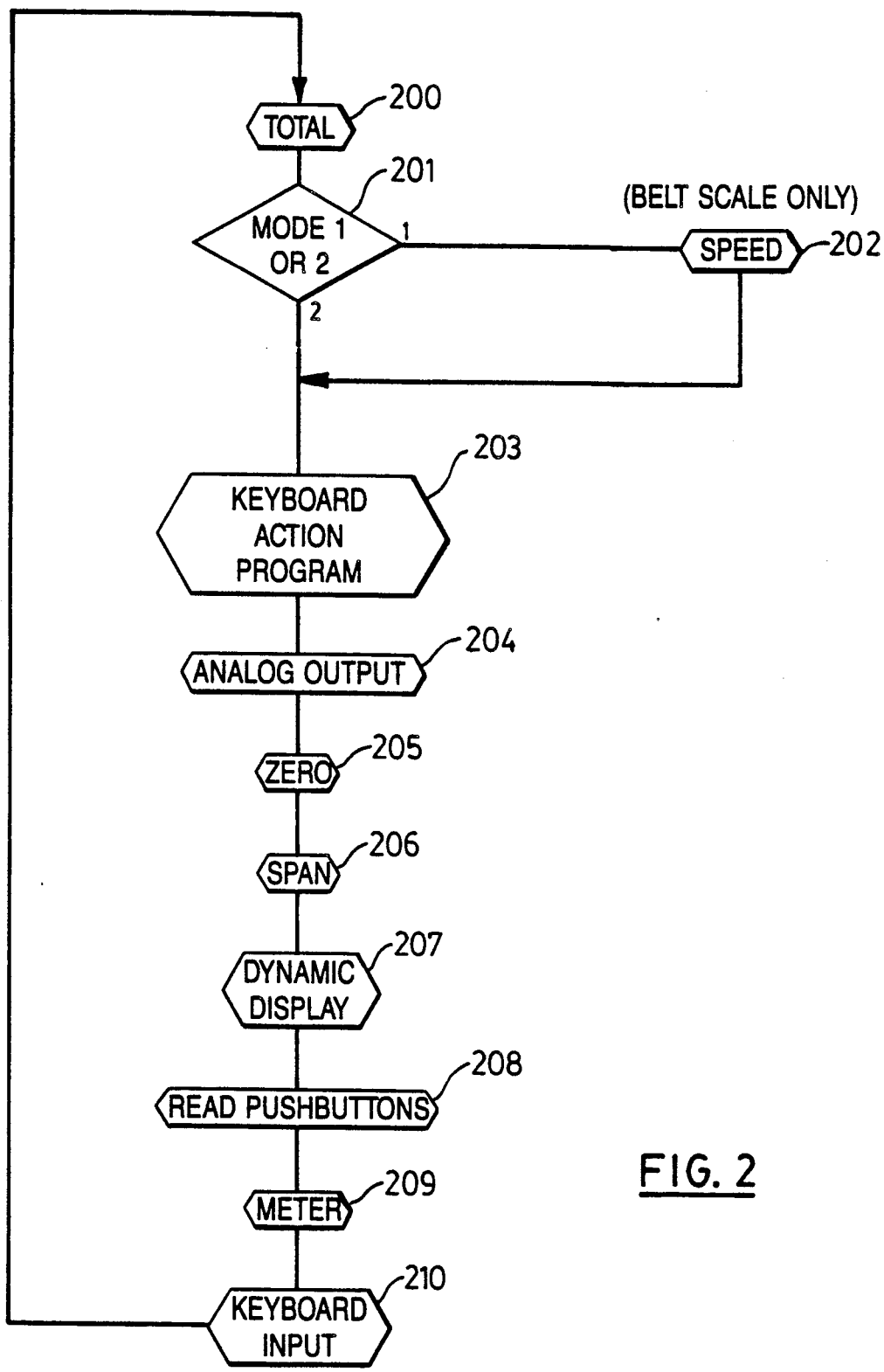
FIG. 2 is a flow diagram of a main program loop of the micro-controller shown in FIG. 1.

In operation, the microcontroller on power-up enters a main program. This first calls a routine INITIALIZE which recovers data stored in EEPROM 24, so as to restore the status of the apparatus to that existing immediately prior to power-down by transferring stored parameters to predetermined locations in RAM 26, initializing certain registers, and also setting both an internally implemented totalizer, whose count is normally displayed by display 36, and the totalizer 44 to an accumulated count reached prior to power-down. It also initializes the display 36. The program then enters an executive control program loop (ECPL) as shown in FIG. 2, which program loop in turn executes in turn a number of subprograms. The subprograms are designed so that their processing does not require more than a fairly minimal time even under worst-case conditions, and so that the entire ECPL can be execute repeatedly at a reasonable rate, typically about eight times per second. While each subprogram will be entered upon each execution of the loop, what is done upon each such entry depends on the setting of operational parameters the settings of flags by previous operations, and operator input using the keyboard or push buttons. As will be seen, subprograms may carry out quite different tasks depending upon these settings.

Figure 7:
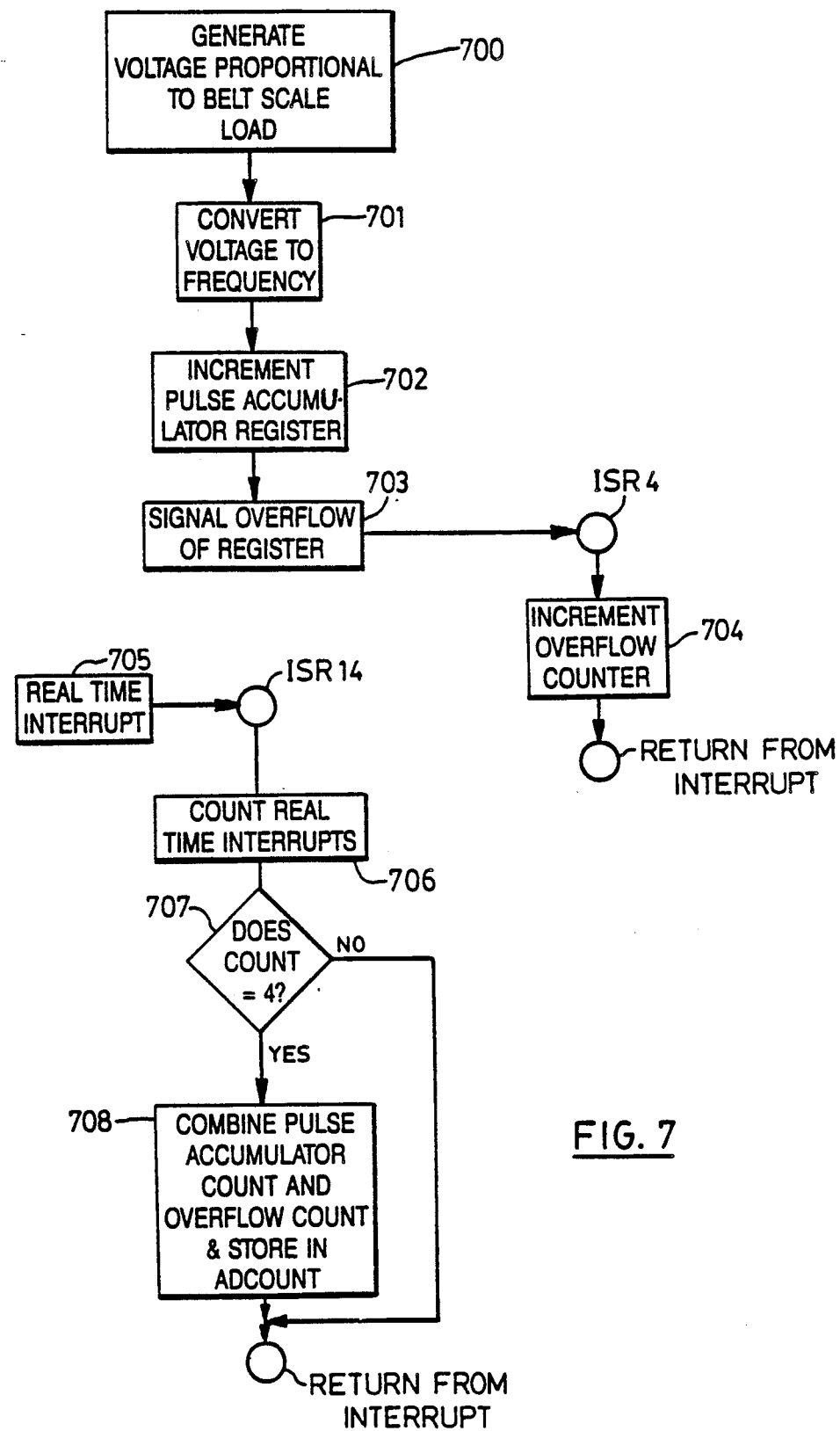
FIG. 7 is a flow diagram of a weight measuring routine.

Certain functions are not conveniently handled within the ECPL; thus, inputs from the belt scale unit 10 and tachometer 18 are handled by interrupt service routines, as is a power-down sequence which stores into the EEPROM 24 the data which is recalled during the INITIALIZE routine. Input from the load cells of the belt scale unit 10 is handled by interrupt service routines ISR14 and ISR4, illustrated by the flow diagram of FIG. 7. The analog voltage input generated by the cells (step 700) is first applied to the voltage to frequency converter 14 which generates (step 701) independently of the controller 16, a series of pulses at a repetition rate proportional to the voltage applied. These pulses are counted (step 702) in a pulse accumulator register which is incremented by each pulse. Overflow of the register generates an interrupt (step 703) which triggers an interrupt service routine ISR4, which increments an overflow counter (step 704) and returns. Real time interrupts generated (step 705) by real time clock 48 trigger an interrupt service routine ISR14 which combines and stores (step 708), as a variable ADCOUNT, the pulse accumulator count and the overflow count from the accumulator count and overflow registers, resets these registers and returns from the interrupt. In order to provide sufficient resolution of the frequency output of the voltage to frequency converter, and according to the rate of generation of real time interrupts by the real time clock 48, the real time interrupts may be counted in a step 706, and only every fourth (or some other appropriate number) interrupt (step 707) acts to store the count ADCOUNT and reset the registers.

Figure 6:
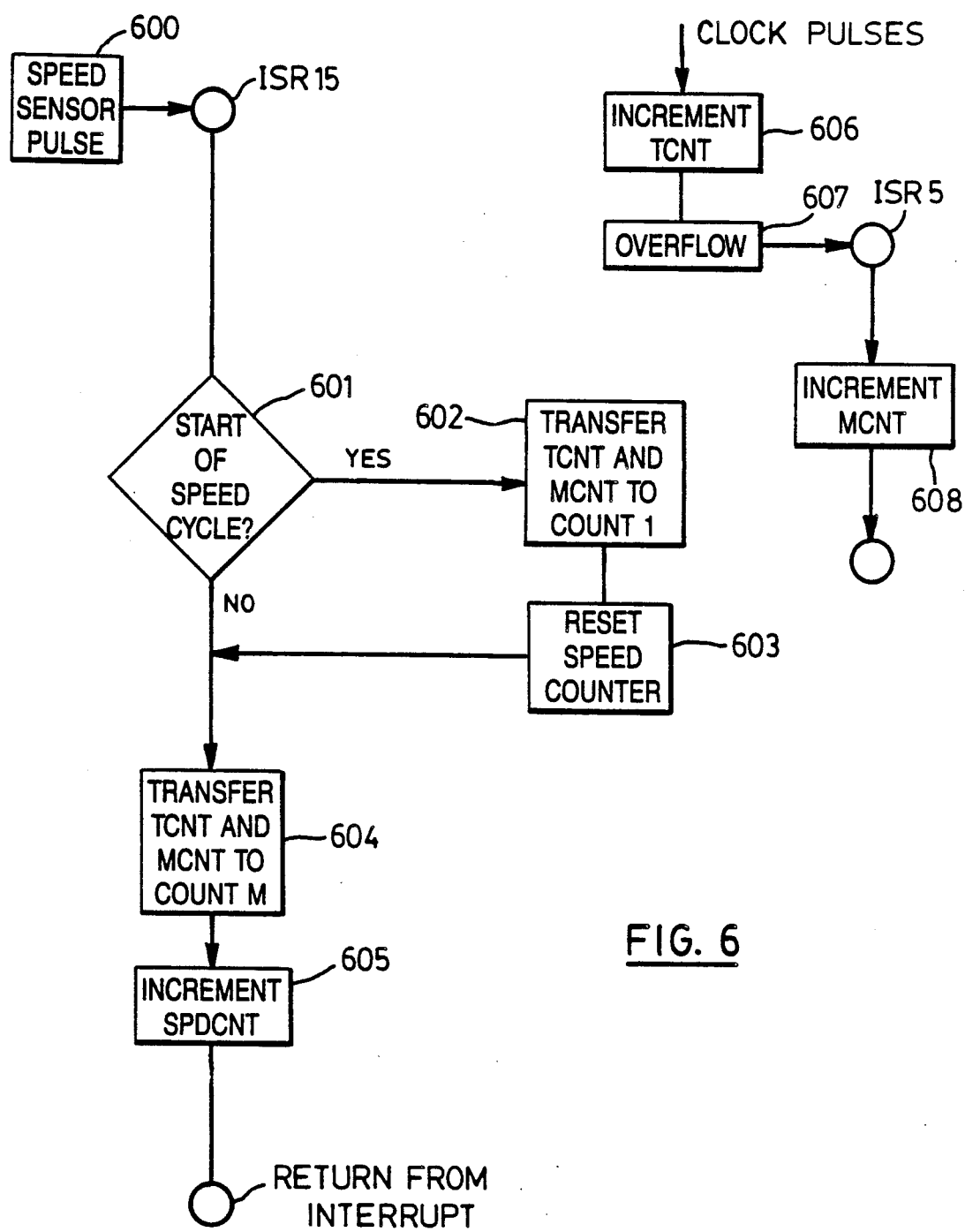
FIG. 6 is a flow diagram of a belt speed measuring routine.

Each pulse generated (step 600) by the tachometer 18 initiates an interrupt service routine ISR15 (see FIG. 6) which first determines at step 601 whether a new speed determination cycle is commencing, as indicated by a speed register SPDCNT being set to zero. If it is, the count of a free running counter clocked by high frequency clock pulses (step 606) is transferred to a register COUNT1 (step 602) and the speed register is reset (step 603). Whether or not the speed counter is set to zero, the count from the free running counter is also transferred to a register COUNTM (step 604) and the speed register SPDCNT is incremented (step 605). The free running counter includes a primary counter TCNT, and an overflow counter MCNT. Overflow (step 607) of the counter TCNT initiates an interrupt service routine ISR5 which increments overflow counter MCNT (step 608) and then returns.

The subprograms called by the executive control program loop (ECPL) shown in FIG. 2 will now be considered. The subprogram 200, entitled TOTAL, calculates the rate of material flow along the belt (or through the flowmeter as the case may be), primarily from the contents of ADCOUNT register, and also increments the local totalizer register implemented by the microcontroller 16, and the remote totalizer 44. The subprogram also increments a supplementary autozeroing totalizer register AZ as discussed further below. The calculated rates used to increment the totalizer registers are adjusted by a zero correction corresponding to an unloaded or no flow condition of the belt or flowmeter, and damping is applied to prevent excessive short term fluctuation of the calculated rate. According to whether the unit is applied to a belt scale or a flowmeter, a mode test 201 either executes or bypasses a program 202 (SPEED) which calculates the speed of the belt of a belt scale from the counts stored in registers COUNT1, COUNTM and SPDCNT by subtracting the content of register COUNT1 from that of COUNTM, dividing the result by SPDCNT, and scaling and damping the result appropriately.

The next subprogram 203 to be called, entitle KEY DATA TO INPUT BUFFER, handles any key value stored as input from the keyboard and exits if no key value has been stored. If a key value has been stored it is transferred to an input buffer, and an appropriate action initiated according to the identity and the existing content of the buffer. Where the content of buffer constitutes a complete command to the system the command is executed if execution is possible, if necessary in multiple stages on successive executions of the ECPL, within the time constraints imposed by the necessity of completing the loop fast enough to allow for a desired repetition rate.

An ANALOG OUTPUT subprogram 204 is called next, which checks whether analog output is required, and performs a step in an analog output procedure if such output is required.

The next subprogram 205 to be entered is a ZERO program, which carries out certain functions involved in a zeroing operation and is described in more detail below. This zeroing operation may be either a zeroing operation which is manually initiated, in which case a flag will be set to initiate the zeroing operation, or an autozeroing operation, in which case the subprogram will either reset or increment a timing register and check whether the register count has reached a calculated level such that an autozeroing operation is due, so that on the following execution of subprogram 205, the zeroing operation can be initiated.

Subprogram 206, SPAN, carries out a conventional span operation if the keyboard action program has responded to keyboard input to set flags indicating that a span operation is required.

Subprogram 207, DYNAMIC DISPLAY, provides functions necessary for updating and maintaining the display 36, and subprogram 208 reads the push buttons 32. These buttons in general provide inputs equivalent to those provided by the keyboard, and equivalent inputs are handled similarly to those from the keyboard, handled by the keyboard input subprogram 210. Subprogram 209, METER, enables the output of the load cells or other sensors to be monitored directly, using the analog to digital converter 42 controlled by microcontroller 16.

Finally, a KEYBOARD INPUT subprogram 210 provides a keyboard input routine which senses whether a key on the keyboard 28 has been depressed and stores the value of any depressed key for subsequent processing by the keyboard action program.

The ECPL loop just described is continuously repeated during normal operation of the unit, the subprograms being constructed as already mentioned so that the execution time of the loop remains fairly constant (typically about 8 times a second). Some tasks carried out by certain of the subprograms such as a zeroing or spanning operation which requires continuous monitoring of the operation of the belt scale or flowmeter over a substantial period must be carried out in stages over many repetitions of the loop. Monitoring of the keyboard, processing normal data input from the scale or flowmeter, display of this data, and response to the keyboard commends requiring display or alteration of operating parameters are all handled during the normal execution of the loop, although again some operations will be handled in stages over multiple repetitions of the loop, such as digital-to-analog conversion of data, and the capture and subsequent processing of multiple character command strings from the keyboard. Where commands are generated automatically during operation of the machine, they can be conveniently handled by inserting them into a keyboard buffer as if they had been entered from the keyboard 28 or push buttons 32.

Zeroing operations may be of several different types, initiated in different ways. When the apparatus is first powered up, an initial zeroing operation is required. A zeroing operation may be initiated manually either from the keyboard 28 or by a designated one of the push buttons 32. Finally, a zeroing operation may be initiated automatically if certain conditions are fulfilled.

Figure 3A:
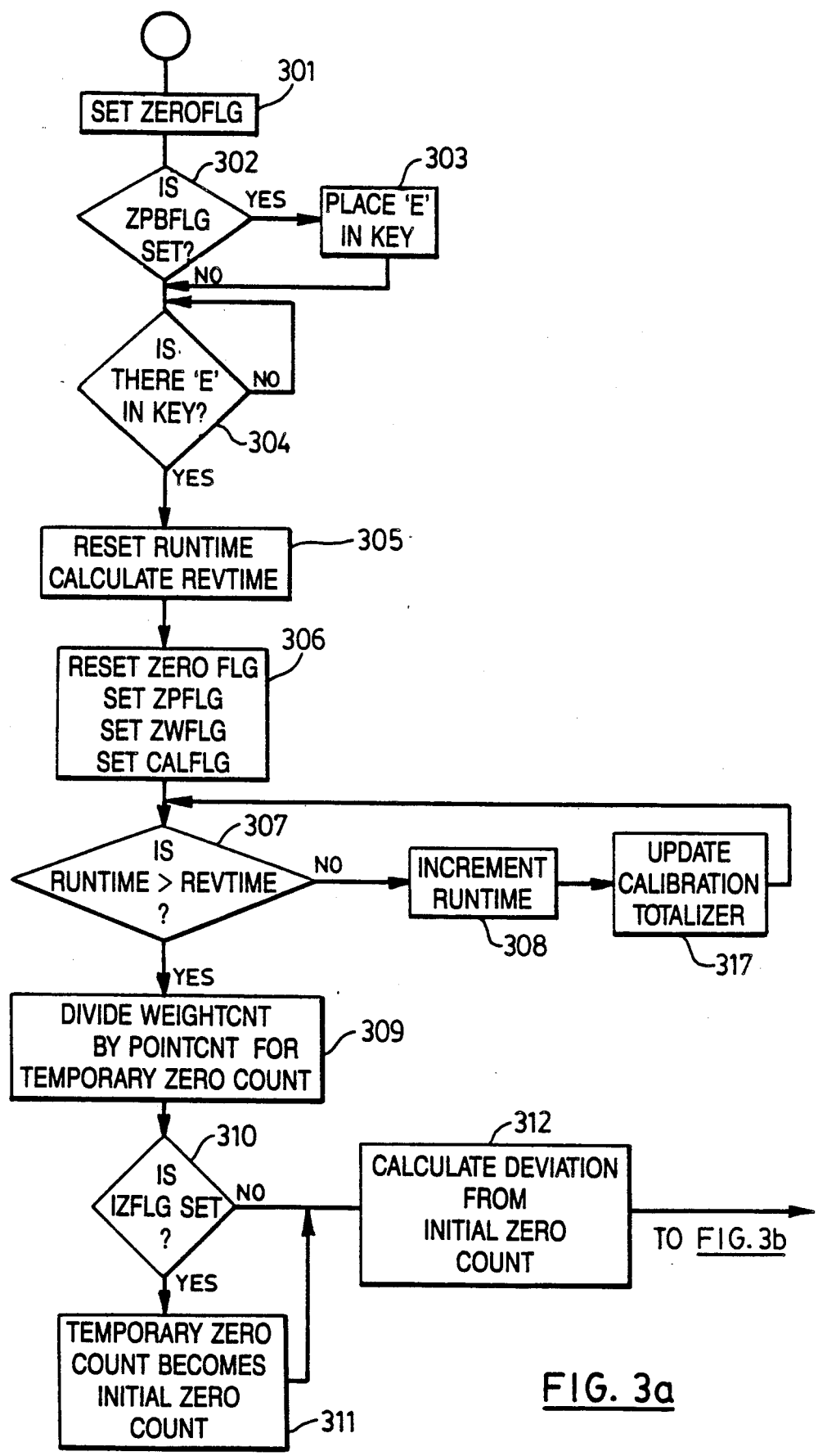
FIGS. 3a and 3b are flow diagrams of a zeroing routine.
Figure 3B:
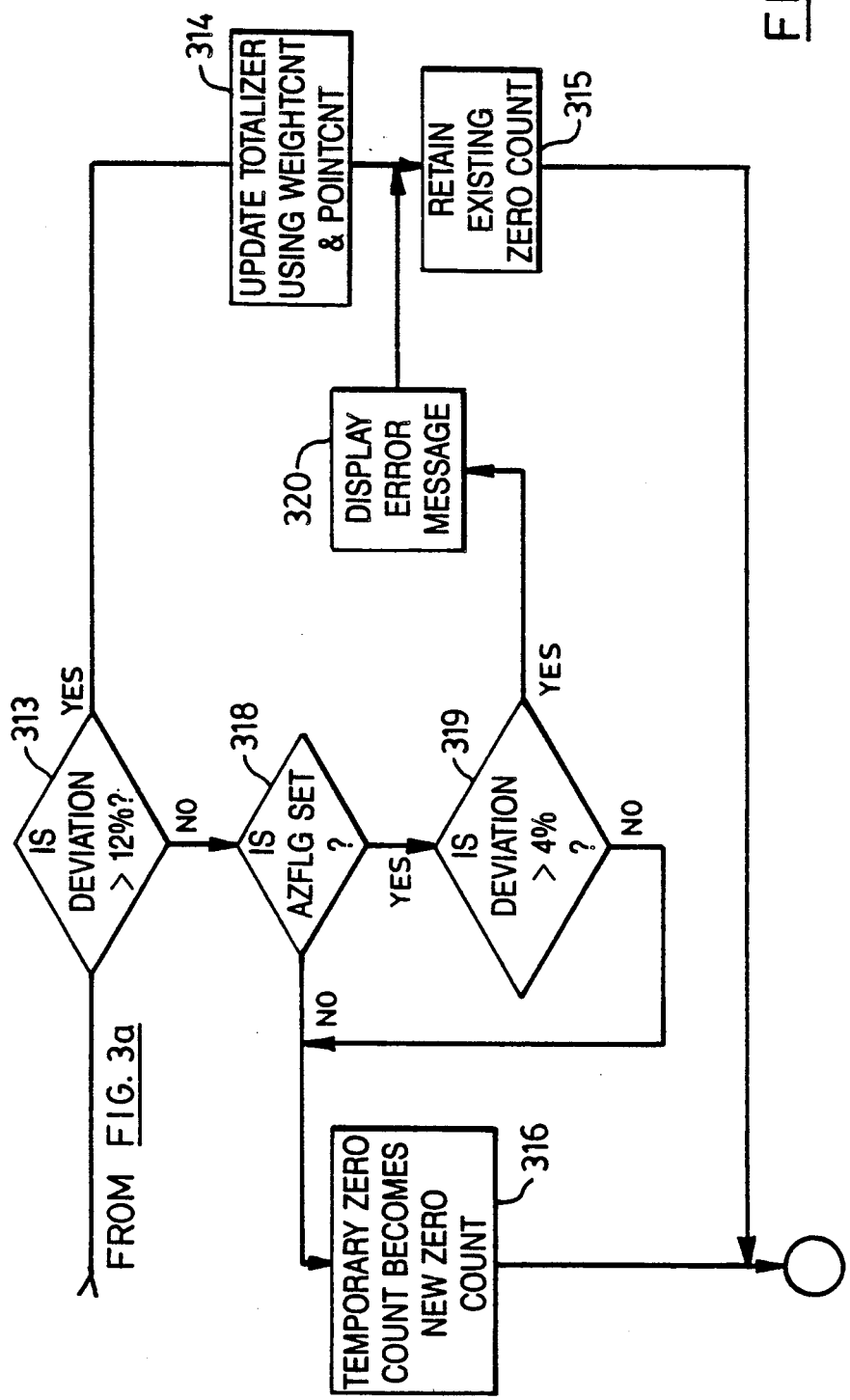

An initial zeroing operation is manually initiated after the apparatus is powered up for the first time, or at any time provided that the operator first sets an appropriate parameter requiring either complete reinitialization of the unit or zero reinitialization only. Detection of any of these conditions results in a flag IZFLG being set. The flag setting of this flag disables testing for whether the zero setting determined deviates excessively from that already existing. Otherwise the process is as described below, with reference to FIGS. 3a and 3b.

If a zeroing operation is initiated manually by keying a 'Z' at the keyboard, the KEYBOARD INPUT program 210 reads the keyboard and stores a 'Z' in a variable KEY. If a zeroing operation is initiated manually by push button, the READ PUSH BUTTONS program does the same thing provided that a zeroing operation is not already in progress. A flag ZPBTFLG indicating that a push button zeroing operation has been requested is also set in this case. The keyboard action program 203 then reacts to the 'Z' in KEY by clearing various flags and registers and setting a flag ZEROFLG (step 301) to indicate that a zeroing operation has been requested. If the flag ZPBFLG is found set (step 302), it also stores an 'E' as the variable KEY in place of the 'Z' (step 303). Otherwise, the ECPL continues until the KEYBOARD INPUT program determines (step 304) that the enter key has been pressed to initiate the zeroing operation in which case it stores an 'E' in the variable KEY.

Upon the next execution of the KEYBOARD ACTION program, the presence of the 'E' in variable KEY is detected, and after determining that it does not represent the end of a parameter entry, an EXECUTE subprogram is called, the operations carried out by this program depending on the flag settings which it finds. The EXECUTE subprogram first calls a routine RESCTRS (step 305) which resets various registers to suit a zeroing or spanning operation including a register RUNTIME, calculates from available data the time for one belt revolution, which it places in a register REVTIME, and then tests the flag ZEROFLG. If found set, it is reset, and a flag ZPFLG is set to indicate that a zeroing operation is under way at which point control is returned to the ECPL.

When the ZERO program is entered, it detects that the zero in progress flag ZPFLG is set, and sets (step 306) a zero wait flag ZWFLG, and a calibration flag CALFLG, which cause the TOTAL program to increment RUNTIME, and weight and point count registers for each ECPL during the zeroing operation.

In a following pass through the ECPL, the 'E' in a variable KEY is again detected, but the reset condition of flag ZEROFLG results in no action being taken, while the set condition of the flag ZPFLG results in a timer implemented by the zero program 205 testing (step 307) whether the value in register RUNTIME equals or exceeds that in a register REVTIME, i.e. whether the zeroing operation has been in progress for a full revolution of the belt. The RUNTIME register is updated (step 308) during each execution of the TOTAL program 200 according to the number of real time interrupts which have occurred during the ECPL. The total program also notes that the CALFLG is set, and updates a temporary totalizer register TOTCAL in place of the regular totalizer register (step 317). The program continues to loop through the ECPL until such a time as the content of the RUNTIME register equals or exceeds that of the REVTIME register. At this point, the zero program calculates (step 309) a temporary zero count ZEROCTX from the WEIGHT_CT and POINT_CT data accumulated by the TOTAL program while the zeroing operation was in progress. The zero in progress and zero wait flags ZPFLG and ZWFLG are reset, and a zero deviation flag ZDEVFLG is set before execution returns to the ECPL.

During the following execution of the ECPL loop, the keyboard action program again detects the 'E' entry in register 'KEY', resulting in calling of the 'EXECUTE' subprogram which detects the set condition of the ZDEVFLG and sets the flag ZEROFLG. If the initial zero flag IZFLG was set (step 310), the temporary zero count accumulated during the zeroing operation is adopted (step 311) and stored both as an initial zero count EOZERO and as an existing zero count EZEROCNT, and the ZDEVFLG, ISFLG and ZEROFLG flags are reset. If the initial zero flag is not set, then the difference between the temporary zero count ZEROCTX and EOZERO is expressed (step 312) as a percentage of EOZERO. This percentage, representing the percentage deviation ZDEV of the zero from its initial value, is then compared (step 313) with a threshold, typically 12%, to determine whether the result of the zeroing operation should be rejected as erroneous since it represents an excessive deviation, probably due to material passing on the belt during the zeroing operation. In this case, the content of the calibration totalizer TOTCAL is added to the regular totalizer (step 314), and the existing zero setting is retained (step 315). If the deviation is less than 12%, the temporary zero count is stored (step 316) as the actual zero count EZEROCNT, and the ZDEVFLG and ZEROFLG flags are reset, thus terminating the zeroing operation.

Prior to initiating an autozeroing operation, it is necessary for the system to determine that the conditions are suitable, i.e. that the belt is moving normally but there is no material flow, and that these conditions have existed long enough that they are likely to continue during execution of a zeroing operation. Additionally, provision must be made to abort the zeroing operation if material flow should commence while it is in progress, and it is desirable to avoid adoption of any zero count obtained which shows an unusually large deviation from the initial value.

Figure 4:
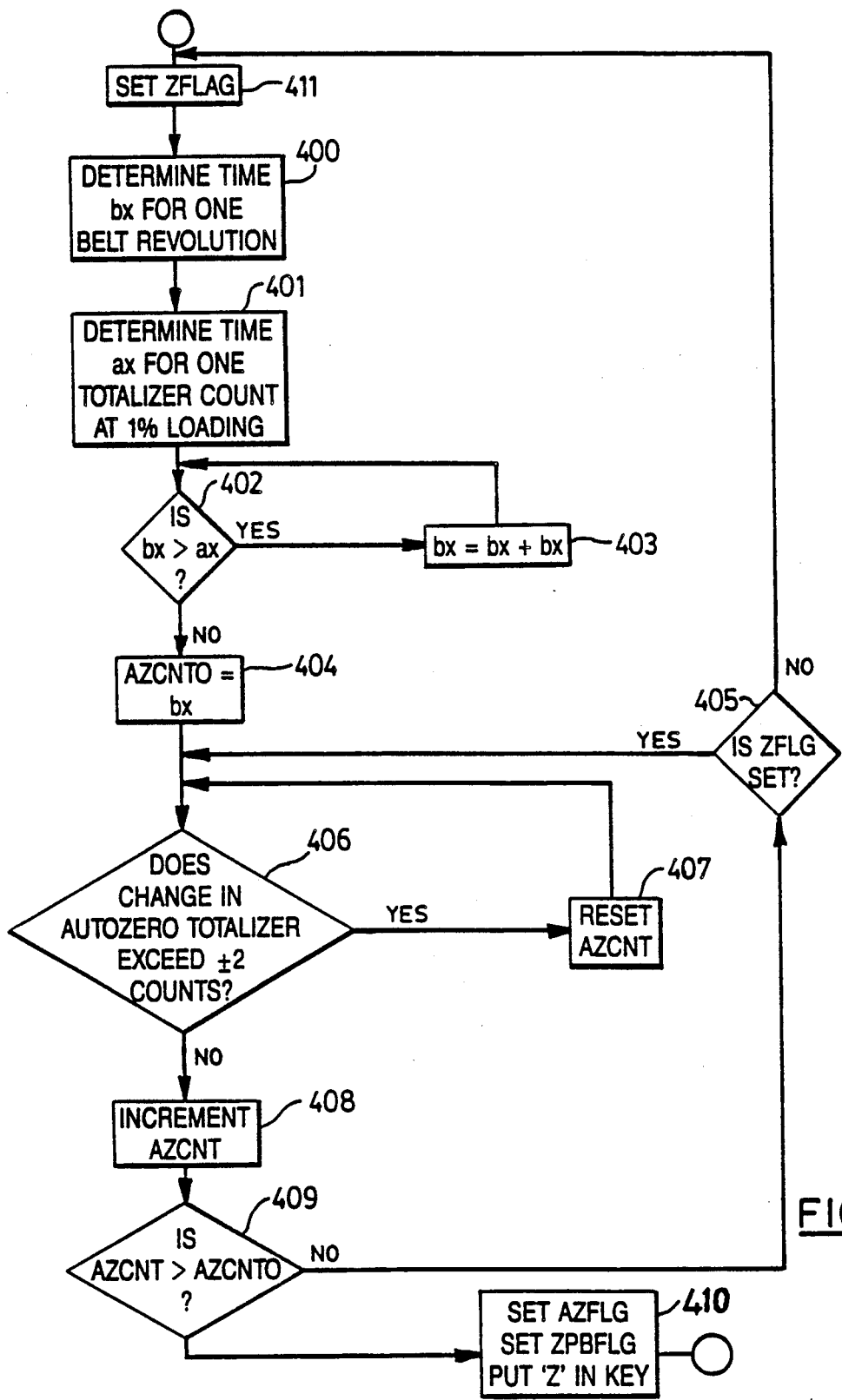
FIG. 4 is a flow diagram of an autozeroing initiation routine.

Whenever any operating parameter of the apparatus is changed, or when an autozeroing operation is completed, a flag ZFLG is cleared. This causes the ZERO program 205 to enter a routine (see FIG. 4) which first calculates a value AZCNT0 which represents the number of cycles through the ECPL for which suitable autozeroing conditions must persist before an autozeroing operation is initiated. It should be noted that while for convenience the flow diagram of FIG. 3 shows various steps as a continuous routine, the steps are in fact carried out by operations in both the ZERO and TOTAL subprograms over many executions of the EPCL.

A calculation (step 401) is made of the number ax of ECPL loops required for the totalizer to be incremented by a single count when the belt is carrying a very small portion, typically 1%, of its rated load rate. Thus, if the apparatus executes the ECPL n times/second, and TOTC represents the weight of material resulting in one totalizer count, then $$ax = TOTC*n*3600/0.01 \text{ RATE}.$$

In order to allow for belt splices and irregularities, the belt should be monitored over a period which represents an exact number of belt revolutions, so the number ax of cycles through the ECPL occurring during one complete belt revolution, previously calculated (step 400) as $$bx = n*BELTL/SPEED \text{ C}$$

where BELTL is the length of the belt, and SPEED-C is the current speed of the belt. A comparison (402) is then made between bx and ax, and if bx is less than ax, bx is added to itself (step 403), and the comparison repeated until bx is no longer less than ax at which point bx is stored as AZCNT0 (step 404).

During this procedure, the flag ZFLG is set (step 411) so that the above calculations are not repeated unnecessarily (see step 405).

When the TOTAL program 200 is executed upon each pass through the ECPL, it not only performs calculations to determine whether alteration is required to the main and remote totalizer readings, but also maintains a further totalizer register AZ. In order to avoid fluctuations due to irregularities and splices in the belt, the total weight count accumulated during an ECPL is divided by the number of real time interrupts occurring since the last execution of the TOTAL program to provide an average count ADCNT2 per real time interrupt, this count being adjusted by the zero count ZEROCNT to allow for the existing zero setting and provide an adjusted count CCC. The adjusted count is then multiplied by the belt speed SPEED_C determined by the speed program and an appropriate constant KO2 to obtain a rate figure RATE.

For normal totalization purposes, positive rates below a certain dropout level, corresponding to a small percentage of rated flow, are regarded as corresponding to an empty belt and are disregarded. The rate RATE is thus compared with this dropout level to provide a rate RATE_C which is equal to RATE except that it is set to zero in the event that it is less than the dropout level. The rate RATE_C is then successively deducted from a variable SUM for a number of times equal to the number of timer interrupts during the last ECPL. Each time SUM reaches zero, it is incremented by TOTC, a parameter equal to the totalizer increment, and a totalizer count is incremented by 1. In the event of a negative rate persisting long enough for SUM to reach twice TOTC, then the totalizer count is decremented by 1 and SUM is decremented by TOTC.

Figure 5:
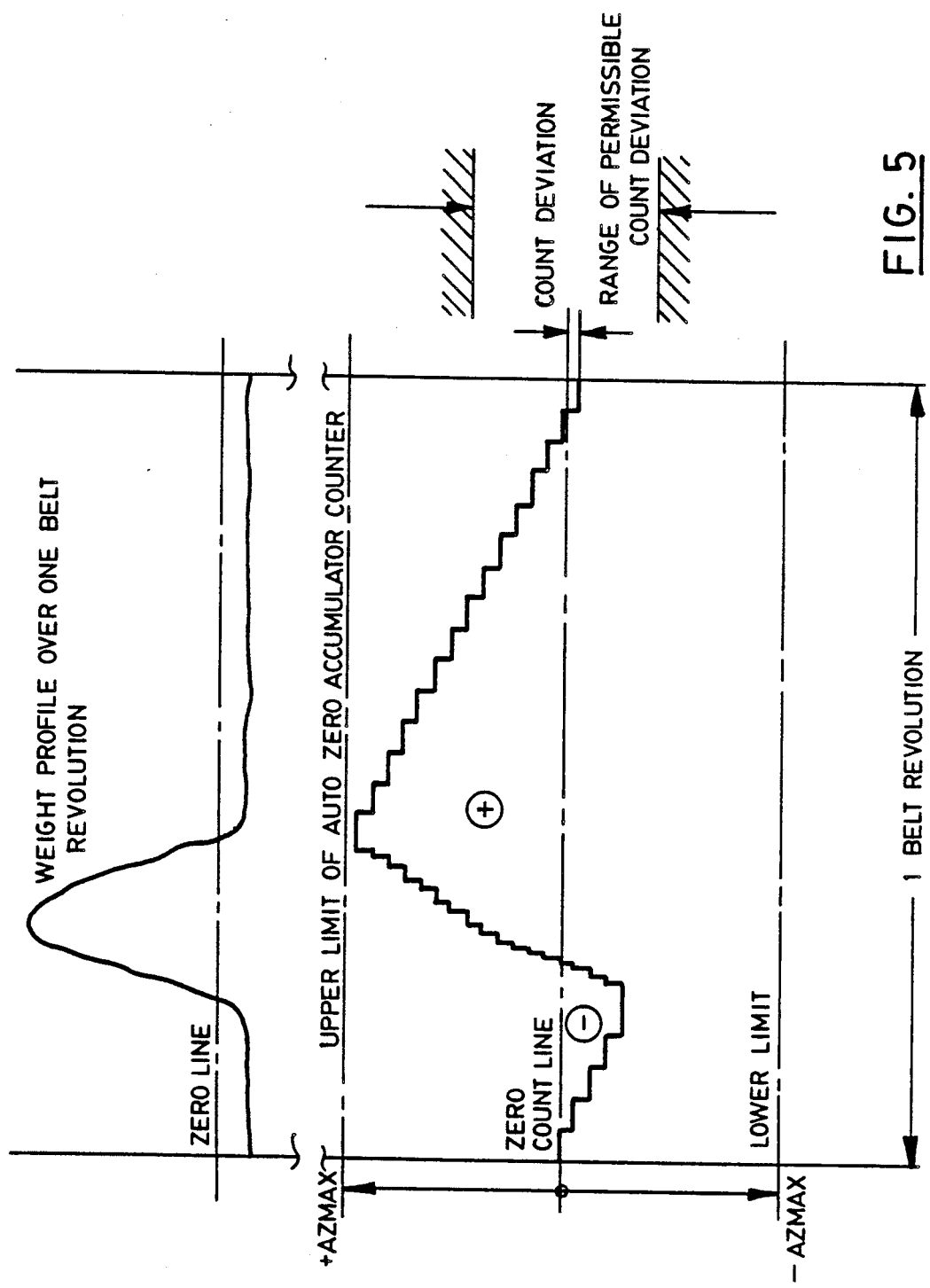
FIG. 5 is a graph illustrating certain aspects of the autozeroing routine.

Since application of such a dropout correction prevents proper operation of the autozero operation, as discussed further below, the separate totalizer register AZ is also maintained, which receives the uncorrected RATE data, RATE being repeatedly added to AZ for each real time interrupt during the preceding ECPL. If the absolute value of the content of AZ, whether positive or negative, is found to exceed (step 406) a value AZMAX, calculated as the equivalent of a predefined number, typically 2, of totalizer counts by which the totalizer may vary from its starting figure, it is assumed that conditions are unsuitable for an autozeroing operation, and a register AZCNT, discussed further below, is reset to zero (step 407). FIG. 5 illustrates how AZ may vary during a belt revolution relative to AZMAX.

Upon each pass through the ECPL, the zero program 205, having established that the apparatus is running normally and that the belt speed is at least one tenth (typically) of its maximum, increments (step 408) the register AZCNT and compares it with AZCNT0 (step 409). Each time AZ exceeds the absolute value of AZMAX, the totalizer program 200 will reset AZCNT (step 407) and the count will recommence. When AZCNT exceeds AZCNT0 (step 409), the autozero sequence is initiated (step 410) by setting variable KEY to 'Z', inserting a 'Z' and setting an autozero flag AZFLG and the zero push button flag ZPBFLG. Thereafter, operation is similar to a zeroing operation initiated by the zero push button and already described above, apart from differences signalled by testing the autozero flag (step 318). The most significant of these differences resides in the assessment of the zero deviation AA obtained after the zero deviation flag ZDEVFLG is set. If the deviation AA is over 12% (for example), the total in TOTAL recorded during the operation is added to the totalizer, no zero correction is applied, and the operation is aborted, it being assumed that material has commenced to pass on the belt during the zeroing operation. If the deviation is less than 12%, but more than 4% (step 319) from the initial value, an error message is generated (step 320), and the existing zero is retained. Only if the deviation is less than 4% from the initial value is a zero correction applied; this avoids dubious corrections being applied without operator supervision.

When a flowmeter rather than a belt is being monitored, the autozeroing operation proceeds similarly, but the period during which readiness for an autozeroing operation is tested, and the period over which it takes place, have to be calculated without reference to belt length or speed, and will normally have a fixed relationship to the present operating parameters of the apparatus, as exemplified in the program excerpts included in the appendix (not re-printed; see application file) to this specification.

The appendix (not re-printed; see application file) to this specification includes portions of an exemplary computer program for control of apparatus constructed and operating as described above, written partially in assembly language for the 68HC11 microcontroller from Motorola, and partially in the 'C' language. So that they stand out in the descriptive text of the specification, all variable and flag names have been rendered in upper case, without quotes. The corresponding names in the program excerpts may be wholly or partially in lower case characters, and the latter versions are those in fact declared in the program. It will be noted from the program excerpts and from the above description that it is a characteristic of the program that nothing is allowed significantly to delay regular execution of the ECPL. The interrupt service routines to which reference is made above are rapidly executed using available data, and the execution steps carried out by the ECPL are all performed on available data; at no point does the program loop wait for data to become available, despite the considerable periods required to carry out some of the steps required in zeroing and other operations to be performed.

APPENDIX

Copyright Millbronics, division of Federal Industries Industrial Group Inc.

```
1 #include "compu.c"
1 /*
2 ****************
3 *    COMPU.C    *
4 ****************
5 */
6 #include <R668HC11.H>
7
8 extern unsigned char  DBUF[],LAST, Mode;
9 /***************************************************************/
10
11
12 /*
13 * BEGIN OF MAIN PROGRAM *
14 ****************************
15 The startup module  (st_up.s) begins execution
16 at memory location $8700  (PROGRAM_CODE section)
17 and then transfers control to main().
18
19 main() will start at memory loc $8000
20 library routines will start at   $E000
21
22 The above addresses are set in the indirect file: compu.i
23 */
24
25
26
27 main()
28 {
29     initial();
30
31     /*
32       Executive Control Program Loop
33       ********************************
34     */
35     ecploop:
36     for  (LAST=0; LAST<11; LAST++)
37         switch(LAST)
38         {
39         case 0:
40             tot_prg();              /* Totalizer                 */
41             break;
42         case 1:
43             if (Mode=='2')
44                 break;              /* FLOWMETER                 */
45             speed_prg();            /* Speed                     */
46             break;
47         case 2:
48             keyin();                /* Key-Data input            */
49             break;
```

```
50      case 3:
51          analog_out();          /* Analog output       */
52          break;
53      case 4:
54          zero_prg();            /* Zero                */
55          break;
56      case 5:
57          span_prg();            /* Span                */
58          break;
59      case 6:
60          dyn_displ();           /* dynamic display     */
61          break;
62      case 7:
63          read_pb();             /* read pushbuttons    */
64          break;
65      case 8:
66          meter_prg();           /* read raw signal     */
67          break;
68      case 9:
69          kbdin();               /* keyboard input      */
70          break;
71          LAST=10;
72
73      }
74
75      goto ecploop;
76  }                              /*
77  ******end of main *********/
78
79  /*

3  #include "prog0.c"
 1  /*
 2  ******************************
 3  *    TOTAL PROGRAM   (prog0) *
 4  ******************************
 5  */
 6
 7  #pragma section PROGRAM_CODE PROG0_CODE
 8
 9  extern unsigned char  calflg,codep,DBUF[],e2flg,
10                        Erdyfll,Etotalc,Mode,ncnt,nrti,nrtirm,nrtim,nix,nx,nxmm,
11                        PPROG,rpt,runflg,zeroflg,spanflg,Units,*pcsix;
12  extern float          ad2,ad2p,adcnt2,az,AZmax,Dropout,DAMP,K02,KL02,load_c,
13                        rate_c,rate_d,runtime,RATE,SPEED,sumcal,WEIGHT,
14                        load_d,speed_c,sum,sumr,total,totcal, TOTC, TOTRC,
15                        zerocnt,*pdvidx;
16  extern long int       Etotal,dtotal;
17  extern unsigned int   azcnt;
18  extern long int       adct,adct_s,weight_ct,point_ct;
19  /********************************************/
20  tot_prg()                      /* total accumulation  */
21  {
22  /*
23  CALCULATE RATE
24  */
```

```
25      int i;
26      char *pEt=&Etotalc;                /* first byte of Etotal      */
27      float drpout,rate,ccc;
28      if (nrti==0)
29          return(0);
30      nrtim = nrti;                      /* remember no of real time interr*/
31      adct=adct_s;
32      nrti  = 0;
33      nrtirm= nrtim;
34      if (calflg!=0)
35      {
36          runtime=runtime+(0.26216*nrtim);/* 8*0.03277=0.26216         */
37          weight_ct=weight_ct+ adct;
38          point_ct=point_ct+nrtim;
39      }
40      if ((calflg==0) && (runflg==0)&& (codep!=0x15))
41          return(0);
42      adcnt2=(float)adct/(float)nrtim;
43      if (adcnt2<=0)
44          adcnt2=0;
45      if (((adcnt2-ad2p)>5)||((ad2p-adcnt2)>5))
46      {
47          rpt++;
48          if (rpt>3)                     /* assign value 1 to 5        */
49          {
50              ad2p=adcnt2;
51              rpt=0;
52          }
53          else
54              adcnt2=ad2p;
55      }
56      else
57      {
58          ad2p=(adcnt2+ad2p)/2;
59          rpt=0;
60      }
61      if (zeroflg==0 && spanflg==0)
62      {
63          ad2=adcnt2;
64      }
65
66 /*   if BELT SCALE */
67      if (Mode=='1')
68      {
69          ccc=adcnt2-zerocnt;
70          rate=ccc*K02*speed_c;
71          rate_c=rate;
72          load_c=(ccc)*KL02;
73          load_d=(load_c-load_d)/DAMP+load_d;
74          if ((load_d<0)||(load_d>WEIGHT*2))
75              load_d=load_c;
76          if ((load_d<0)&&(Dropout!=0)&&(calflg==0))
77              load_d=0;
78                                          /* load_c= current weight */
79                                          /* K02= weight/count          */
80          if (calflg==0)
```

```
81      {
82          drpout=(Dropout*WEIGHT)/100.;
83          if (((load_d-drpout) > 0.) || Dropout==0 )
84              rate_c=ccc*K02*speed_c;
85          else
86              rate_c=0;
87      }
88      else                        /* calflg=1                  */
89      {
90          rate_d=rate_c;
91      }
92  }
93
94 /* if FLOWMETER */
95  else
96  {
97      rate=(adcnt2-zerocnt)*K02;
98      rate_c=rate;
99
100     if (calflg==0)
101     {
102         drpout=(Dropout*RATE)/100.;
103         if ((  (rate>0)  && ((rate-drpout) >0.)) || Dropout==0)
104             rate_c=rate;            /* rate_c= current rate      */
105                                     /* K02= rate/count           */
106         else
107             rate_c=0;
108     }
109     else                        /* calflg =1                 */
110     {
111         rate_d=rate;
112     }
113 }
114 /*
115 *   Damping of rate output *
116 */
117 if (nx==0)
118 {
119     rate_d = (rate_c - rate_d)/DAMP + rate_d;
120                                     /* rate_d = damped rate      */
121                                     /* rate_c = current rate     */
122     if ((rate_d<0)||(rate_d>RATE*2))
123         rate_d=rate_c;
124 }
125 /*********************************/
126 /*
127 INCREMENT LOCAL TOTALIZER
128 */
129 if (codep==0x15)
130     azcnt=0;
131 if ((calflg==0)&&(Erdyfll==0xFF))
132 {
133     while (nrtim > 0)
134     {
135         az=az+rate;
136         if (az<(-AZmax))
```

```
137            {
138                azcnt=0;
139                az=0;
140            }
141            if (az>AZmax)           /*AZmax=Np*TOTC*3600/(8*0.03277) */
142            {
143                azcnt=0;
144                az=0;
145            }
146            sum = sum - (rate_c*7.2822E-5);/* rate              */
147                                    /* (8*0.03277)/3600 =7.2822E-5  */
148            if (sum < 0.)
149            {
150                dtotal++;
151                if (dtotal>9999999)
152                    dtotal=0;
153                total=dtotal*TOTC;
154                sum = sum + TOTC;
155            }
156            if (sum > 2*TOTC)
157            {
158                dtotal--;
159                total=dtotal*TOTC;
160                sum = sum - TOTC;
161            }
162            nrtim--;
163        }
164    }
165    else
166    {
167        while (nrtim > 0)
168        {
169            sumcal = sumcal - (rate_c*7.2822E-5);/* rate         */
170            if (sumcal < 0)
171            {
172                totcal = totcal + TOTC;
173                sumcal = sumcal + TOTC;
174            }
175            if (sumcal > 2*TOTC)
176            {
177                totcal = totcal- TOTC;
178                sumcal = sumcal - TOTC;
179            }
180            nrtim--;
181        }
182    }
183 /*
184 INCREMENT REMOTE TOTALIZER
185 */
186    if ((calflg==0)&&(Erdyfl1==0xFF)&&(runflg!=0))
187    {
188        while (nrtirm > 0)
189        {
190            if (ncnt<45)
191            {
192                ccc=rate_c*7.2822E-5;
```

```
193              if (TOTRC<ccc)
194              {
195                  sumr=TOTRC;
196                  if (e2flg==0)
197                  {
198                      e2flg=1;
199                      if (nx!=15)
200                          nxmm=nx;
201                      ncnt=0;
202                      err2();
203                  }
204                  ncnt++;
205                  nrtirm=0;
206                  return(0);
207              }
208              sumr = sumr - (ccc);    /* rate              */
209              if (sumr < 0)
210              {
211                  ncnt++;
212                  if (ncnt>40)
213                  {
214                      if (e2flg==0)
215                      {
216                          e2flg=1;
217                          if (nx!=15)
218                              nxmm=nx;
219                          err2();
220                      }
221                  }
222                  sumr=sumr+TOTRC;
223              }
224          }
225          else
226          {
227              e2flg=0;
228              ncnt=0;
229          }
230          nrtirm--;
231      }
232   }
233   else ncnt=0;
234 }
235 /*******************************************/

4 #include "prog1.c"
  1 /*
  2 ***************************************
  3 *      SPEED PROGRAM      (prog1)     *
  4 ***************************************
  5 */
  6 #pragma section PROGRAM_CODE PROG1_CODE
  7
  8
  9 extern unsigned char plcnt,nx,Erdyfll,Mode,PORTA,siflg,Units,spdc;
 10 extern unsigned int  mcntm,mcnt_m,spdcnt,spdct_m;
 11 extern unsigned int  azcnt,count1,cnt1_m,cntn_m,countn;
```

```
12 extern float        BELTL,DAMP,SPEED,SPDCON,speed_c,speed_d;
13
14 extern float        runtime,revtime,
15                     time;               /* time between speed pulses   */
16
17 /***********************************************************/
18 /*
19 The evaluation of speed is done by measuring the interval
20 time between speed input pulses. As a measuring stick the
21 E-clock/16 is used.
22       E-clock =1/4 XTAL = 2 MHz
23          to fill a 16 bit counter (TCNT) takes
24                      65536/125,000=0.5243 sec
25 When TCNT overflows an interrupt is generated. timovl() in ISRS (ST_UP.S)
26
27 The speed input is connected to the input for the
28 input capture 1 register (TIC1). PORTA bit 2.
29 1. At the first speed interrupt (spdcnt=0) :
30       TCNT is xferred to TCI1 internally by CPU logic.
31       Increment spdcnt by 1
32       Read TCI1 count and store into count1
33 2. On next speed interrupt:
34       TCNT is xferred to TCI1 internally by CPU logic.
35       Read TCI1 count and save in countn
36       Increment spdcnt by one
37       Reset spdcnt =0
38 ***********************************************************/
39
40 speed_prg()
41 {
42     float k64=65536;              /* TCNT (TCI1) full count        */
43     float k125=125000;            /* E-clock 2 Mhz/16              */
44     if (Mode=='2')                /* exit if FLOWMETER             */
45         return(0);
46     if (Erdyfl1 &0xFC !=0xFC)     /* check if all parameters ok    */
47         return(0);
48
49     if ((PORTA & 0x02)==0)        /*bit1=0 of PORTA (IC2)          */
50     {                             /*Const Speed contact input      */
51         speed_c = SPEED;          /* constant speed = rated speed  */
52         speed_d = SPEED;
53         return(0);
54     }
55     p1cnt++;
56     if (p1cnt==0)
57         p1cnt=0xFF;               /*avoid foldover to 0            */
58     if (p1cnt>2 && spdcnt>=2)
59     {
60         p1cnt=0;
61         mcnt_m=mcntm;
62         cntn_m=countn;
63         cnt1_m=count1;
64         spdct_m=spdcnt-1;
65
66         siflg =0;                 /* speed input flag              */
67         spdcnt=0;                 /* speed pulse count             */
```

```
68
69          time=((mcnt_m*k64)+cntn_m-cnt1_m)/(spdct_m*k125);
70          if (Units)='3')
71              speed_c = 60/(time*SPDCON);/* ft/min                */
72          else
73              speed_c = 1/(time*SPDCON); /* m/sec                 */
74      }
75
76      else if (p1cnt==0xFF && spdcnt==0)
77          {
78              speed_c=0;
79              runtime= revtime;
80              azcnt=0;
81          }
82 /*
83 *    Damping of speed  *
84 */
85      dmpg:
86      if (nx==3)                     /* alt display=speed          */
87          speed_d =(speed_c-speed_d)/DAMP+speed_d ;
88      if(speed_d<0)
89          speed_d=0;
90      if (spdc==0x7F)
91          speed_d=0;
92 }
93 /*****************************************/
94
95 /*

7 #include "prog4.c"
 1 /*
 2 ****************************
 3 *    ZERO PROGRAM   (prog4)    *
 4 ****************************
 5 izflg is set in exec.c when initial zero is requested.(code 77)
 6 */
 7 #pragma section PROGRAM_CODE PROG4_CODE
 8
 9 extern float  BELTL,speed_c,Espncnt,Ezerocnt,SPEED, RATE,Nzero,
10               revtime, runtime,tbelt,
11               TOTC,speed_d,speed_c,tempx,zdev, zeroctx, zerocnt;
12
13 extern char   Units,azflg,calflg,DBUF[], nx,nix, dflg,Erdyfl1, Erdyfl2,izflg, key,
14               Mode,PORTA,runflg,rdyflg1,zdevflg, zpbflg,zwflg,zflag, zpflg,zpbflg;
15 extern unsigned int azcnt,azcnt0;
16 extern long int  point_ct,weight_ct;
17 extern float *ptx;
18 extern char *pcsix;
19
20 /****************************************************/
21
22 zero_prg()
23 {
24      float ax,bx,n;
25      n=7.75;                        /*number of ECP loops/sec      */
26      if (zflag!=0x55)               /*aux flag for auto zero       */
```

```
27      {
28          zflag=0x55;
29          if (Mode=='2')                      /*Flowmeter                          */
30              bx=(360000./RATE)*TOTC*n;
31
32          else
33          {
34              if (Units>'2')
35                  tbelt=60.*BELTL/speed_c;
36              else
37                  tbelt=BELTL/speed_c;
38              bx=n*tbelt;
39              ax=(360000./RATE)*TOTC*n;
40              while (ax>bx)
41                  bx=bx*2;
42          }
43          azcnt0=(unsigned int)bx;
44
45                          /* (3600*100/RATE)*TOTC  is the time it takes
46                                  to accumulate one count at 1% of RATE.
47                              tbelt =  time for one belt revolution*/
48      }
49
50      if (((PORTA &0x01)==0)&& (runflg==1)&& (DBUF[0]!='P'))
51      {
52          if (Mode=='1')
53          {
54              if (speed_c< (SPEED/10))
55              {
56                  azcnt=0;
57                  azflg=0;
58                  runtime= revtime;
59              }
60          }
61          azcnt++;
62          if (azcnt>azcnt0)
63                                              /*AUTO ZERO
64                                                  initiate if totalizer has not
65                                                  been incremented for some time*/
66          {
67              azcnt=0;
68              zpbflg=1;
69              key='Z';                        /* force execution of prog2 Z-key*/
70              azflg='1';
71              return(0);
72          }
73      }
74  fm: if (zpflg==0)                           /*zero in progress flag              */
75          return(0);
76
77      if ((((Erdyfl1 & 0xfc) !=0xfc) || ((Erdyfl2 & 0xff) !=0xff))&& Mode=='1')
78      {
79          error(5);                           /* parameters not entered            */
80          return(0);
81      }
82      calflg=1;
```

```
83      if (zwflg==0)                  /* zero wait flag              */
84      {
85          zerocnt=Ezerocnt;
86          zwflg=1;
87      }
88
89      if (runtime>= revtime)
90                                     /*runtime incremented 32.77msec in ISR*/
91                             /*revtime=time for one belt revolution in sec*/
92                                     /* calc in res_ctrs()          */
93      {
94          zeroctx = (float)weight_ct/(float)point_ct;
95          if (izflg=='1')
96          {
97              zerocnt=zeroctx;
98          }
99          if (Espncnt==0.)
100             zdev=((zeroctx-zerocnt)*25)/zerocnt;/* zero deviation  */
101         else
102             zdev=((zeroctx-zerocnt)*100)/Espncnt;/* zero deviation */
103
104         zpflg=0;
105         zwflg=0;
106         zdevflg=1;                 /* set deviation flag           */
107         DBUF[1]='d';
108         ldbuf(&zdev,pcsix+7);      /* zdev (zero deviation )       */
109         if (azflg=='1')
110             key='E';
111         nx=15;
112     }
113     else
114     {
115         if (dflg==0)
116         {
117             if (((Erdyfl1 & 0x02)!=2)||izflg=='1')
118                 nx=4;               /* A/D count                   */
119             else
120             {
121                 if (Mode=='1')
122                     nx=2;           /* for scale: show load        */
123                 else
124                     nx=0;   /* for flowmeter: show rate */
125             }
126             nix=nx;
127             led();
128         }
129     }
130 }
131 /*****************************************************/
132
133 /*

108 /********************************/
109
110 /* reset misc counters for zero/span */
111 res_ctrs()
```

```
112 {
113     weight_ct=0;
114     point_ct =0;
115     runtime  =0;                    /* run time is incr in rtintr() */
116     if (Mode=='1')                  /* BELTSCALE or FLOWMETER       */
117         {

118         revtime=BELTL / speed_c;    /* time for one belt rev        */
119         if (Units)='3')
120             revtime=revtime*60;
121         }
122     else revtime=10;                /* 10 sec -zero/span operation  */
123 }
124 /**************************************************/
125
126 /*

14 #include "exec.c"
 1 /*
 2 ***********************************************
 3 * KEYBOARD EXECUTE PROGRAMS (EXEC.C) *
 4 ***********************************************
 5 */
 6
 7 #pragma section PROGRAM_CODE EXEC_CODE
 8
 9 extern float      AZmax,ad2,apmin,apmax,AP_max, AP_min, BELTL,EPROM[],DAMP,Dropout,
10                   E0zero,E0span,Espncnt,Ezerocnt,fp1,fp2,K02,KL02,kaout,kk,
11                   Nspan,Nzero,RATE,rate_d,RATEOP,spancnt, spanctx,
12                   SPDCON,SPEED,speed_c,sum, sumr,speed_d,tempx,total,TOTC,
13                   totcal,TOTRC,TESTV,testwght,volts,WEIGHT,ww,zerocnt,zeroctx;
14
15 extern char VER[];
16
17 extern unsigned char  azflg,aoutmax,aoutmin,calflg,codep,clrflg,clrmem,
18                   DBUF[],DDRD,DBUFX[],DBUFY[],DELcount,delflg,dtapmt,
19                   emflg, Epcps[],Erdyfl1,Erdyfl2,Erunfl,Factfl,
20                   fpflg,fxpnbr,INBUF[],inbx,Initflg, isflg,
21                   izflg,kev, manflg,meterfl,Mode, Maoutp,nx,nix,Np,
22                   P66flg, P99flg,PORTD,PORTDm,rdyflg1, rdyflg2,runflg,string[],
23                   sdevflg,Sensor,sflg,str[],spanflg,spbflg,swflg,tflg,
24                   Units,vflg,zdevflg,zeroflg,zflag, zwflg,zpflg,zpbflg;
25
26 extern long int   dtotal;
27 extern int        ne;
28 char              *pcsix=Epcps;
29 float             *indx=EPROM;
30 float             *ptx=&tempx;
31
32 /*
33 EXECUTE SELECTED FUNCTION
34 */
35 /* 'ENTER' was pressed in response    */
36 /*  to a function key other than 'P'.*/
```

```
37 /* RUN: no further action           */
38 /* ZERO: initiate zero operation    */
39 /* SPAN: initiate span operation    */
40 /* ALT.DISPL: no further action     */
41 /* RESET TOTAL: no action           */
42 /*              (needs CLEAR )      */
43 /* CLEAR: no action                 */
44 execute()
45 {
46     float aa;
47     res_ctrs();                     /* reset counters          */
48     clrvalu();
49
50     if (zeroflg==1)
51     {
52         if (azflg==0)
53             runflg=0;
54         zeroflg=0;
55         zpflg=1;                    /* zero in progress        */
56         DBUF[0]='o';
57         DBUF[1]='o';
58         if (zpbflg==1)              /* zero push button flag   */
59             key='E';
60         if (Mode=='1')
61             nx=2;
62         else
63             nx=0;
64     }
65     else if (spanflg==1)
66     {
67         if (runflg==1)
68         {
69             error(6);
70             return(0);
71         }
72         spanflg=0;
73         sflg=1;                     /* span in progress        */
74         if (Factfl=='0')
75         {
76             DBUF[0]='S';
77             DBUF[1]='P';
78             if (spbflg==1)          /* span push button flag   */
79                 key='E';
80         }
81         if (Mode=='1')
82             nx=2;
83         else
84             nx=0;
85
86     }
87     if (zdevflg==1)                 /* deviation flag          */
88     {
89         tempx=zeroctx;
90         zeroflg=1;
91         if (izflg=='1')
92         {
```

```
93          fpstor(&E0zero,ptx);        /*E0zero                     */
94          fpstor(&Ezerocnt,ptx);      /* Ezerocnt                  */
95          zdevflg=0;
96          izflg='0';
97      }
98      else
99      {
100         aa=(zeroctx-E0zero)/E0zero;
101         if (azflg=='1')
102         {
103             if (aa>0.12 || aa<-0.12)/*over 12%                    */
104             {
105                 total=total+(totcal);
106                 dtotal=(long int)(total/TOTC);
107                 goto az;
108             }
109             if (aa>0.04 || aa<-0.04)/*over 4% and under 12%       */
110             {
111                 error(9);
112                 zdevflg=0;
113                 azflg=0;
114                 zflag=0;
115                 zeroflg=0;
116                 calflg=0;
117                 total=total+(totcal);
118                 dtotal=(long int)(total/TOTC);
119                 totcal=0;
120                 return(0);
121             }
122
123             zpflg=0;
124             zpbflg=0;
125             dely(2);
126             fpstor(&Ezerocnt,ptx); /* Ezerocnt                    */
127             goto  az;
128         }
129
130         if (aa>0.12 || aa<-0.12)
131         {
132             error(3);
133             return(0);
134         }
135         fpstor(&Ezerocnt,ptx);      /* Ezerocnt                   */
136         zdevflg=0;
137     }
138     rdyflg1=(Erdyfl1 & 0xfe)+ 1;    /* set bit 0                  */
139     chstor(&Erdyfl1,rdyflg1);
140
141     DBUF[1]='C';                    /* indicate complete          */
142     ad2=Ezerocnt;
143     zpbflg=0;
144     nx=4;
145     led();
146     az:
147     if (azflg=='1')                 /* auto zero flag             */
148     {
```

```
149             totcal=0;
150             clrbuf();
151             inbx=0;
152             azflg=0;
153             zdevflg=0;
154             zflag=0;
155             calflg=0;
156             zeroflg=0;
157             nx=Erunfl & 0x07;
158             nix=nx;
159             led();
160             return(0);
161         }
162         else
163         {
164             tempx=Nzero+1.;          /*increment no. of zero operations*/
165             fpstor(&Nzero,ptx);
166             nx=4;
167         }
168     }
```

```
0657
0658                            ;****************************************************/
0659                            ;
0660                            ;********************************
0661                            ;*   INTERRUPT SERVICE ROUTINES  *
0662                            ;********************************
0663
0664 S 004E 3B         ISR1:    RTI
0665 S 004F 3B         ISR2:    RTI
0666 S 0050 3B         ISR3:    RTI
0667                            ;------------------------------------------------------
0668 S 0051            ISR4:
0669                            ;* PULSE ACCUMULATOR OVERFLOW INTERRUPT   (PAOVI) *
0670                            ;***************************************************
0671                            ;                        /* ( bit5=1 of TMSK2 ) */
0672                            ;This Interrupt is part of the Voltage to Frequency A/D Converter
0673                            ;The interrupt occurs when the 8 bit PACNT register becomes full.
0674                            ;256 pulses have been counted when this occurs.
0675                            ;caccu is a 4 byte pulse accumulator
0676                            ;caccu= caccu+ 0x100;
0677
0678 S 0051 FC0056    D          LDD    caccu?+2      ;add 256 to the 2 lsb bytes
0679 S 0054 C30100               ADDD   #256
0680 S 0057 FD0056    D          STD    caccu?+2
0681 S 005A 2407      S          BCC    ISR4a
0682
0683 S 005C FE0054    D          LDX    caccu?
0684 S 005F 08                   INX
0685 S 0060 FF0054    D          STX    caccu?
0686
0687 S 0063 C620      ISR4a:    LDAB   #$20
0688 S 0065 F71025               STAB   TFLG2?
0689 S 0068 3B                   RTI
0690
```

```
0691                        ;----------------------------------------
0692
0693                        ;*    SPEED DETECTION   *
0694                        ;************************
0695                        ;involves ISR5 and ISR13
0696
0697 S 0069                 ISR5:
0698                        ;TIMER OVERFLOW INTERRUPT    (TOI)
0699                        ;*********************************
0700
0701                        ;interrupt occurs when TCNT is full (65536)
0702                        ;2MHz/16=125,000 Hz  (Timer prescale divide factor =16
0703                        ;                     PR1,PR0 =11 in TMSK2          )
0704                        ;65536/125000=0.5243 sec
0705
0706                        ;       /* ( bit7=1 of TMSK2 ) */
0707
0708                        ;if siflg>0
0709 S 0069 F60112      D           LDAB    siflg?              ;speed interrupt flag
0710 S 006C C100                    CMPB    #low 0
0711 S 006E 2707        S           BEQ     I5C2
0712                        ;mcnt++;                 multiple periode count
0713 S 0070 FE0089      D   I5C1:   LDX     mcnt?
0714 S 0073 08                      INX
0715 S 0074 FF0089      D           STX     mcnt?
0716 S 0077                I5C2:
0717 S 0077 C680                    LDAB    #$80
0718 S 0079 F71025                  STAB    TFLG2?
0719 S 007C 3B                      RTI
0720                        ;----------------------------------------
0721 S 007D 3B           ISR6:   RTI
0722 S 007E 3B           ISR7:   RTI
0723 S 007F 3B           ISR8:   RTI
0724 S 0080 3B           ISR9:   RTI
0725 S 0081 3B           ISR10:  RTI
0726 S 0082 3B           ISR11:  RTI
0727 S 0083 3B           ISR12:  RTI
0728                        ;----------------------------------------
0729 S 0084                ISR13:
0730                        ;TIMER INPUT CAPTURE 1   (PORTA bit2)
0731                        ;************************************
0732                        ;           /* ( bit2=1 of TMSK1 ) */
0733                        ;interrupted at every speed input pulse
0734                        ;if (siflg==0)  /*speed input flag =0 at begin of speed detection cycle */
0735
0736 S 0084 F60112      D           LDAB    siflg?
0737 S 0087 C100                    CMPB    #low 0
0738 S 0089 2610        S           BNE     I13C1
0739                        ;count1=TIC1; /*Interrupt has xferred TCNT to TIC1 */
0740 S 008B FC1010                  LDD     TIC1?
0741 S 008E FD005E      D           STD     count1?
0742 S 0091 4F                      CLRA
0743 S 0092 5F                      CLRB
0744 S 0093 FD0089      D           STD     mcnt?
0745                        ;siflg=1;
0746 S 0096 C601                    LDAB    #low 1
```

```
0747 S 0098 F70112      D          STAB    siflg?
0748 S 009B                  I13C1:
0749                         ;countn=TIC1;
0750 S 009B FC1010                 LDD     TIC1?
0751 S 009E FD0060      D          STD     countn?
0752                         ;spdcnt++;
0753 S 00A1 FE00AD      D          LDX     spdcnt?
0754 S 00A4 08                     INX
0755 S 00A5 FF00AD      D          STX     spdcnt?
0756 S 00A8 FC0089      D          LDD     mcnt?
0757 S 00AB FD0085      D          STD     mcntm?
0758 S 00AE C604                   LDAB    #$04
0759 S 00B0 F71023                 STAB    TFLG1?
0760 S 00B3 3B                     RTI
0761                         ;-----------------------------------------
0762                         ;VOLTAGE TO FREQUENCY A/D CONVERTER
0763                         ;*********************************
0764
0765                         ;Real Time Interrupt
0766                         ;Interrupt every 32.77 ms (RTR1,RTR0= 11 in PACTL, XTAL=8.0MHz)
0767                         ;                                       ( Eclock=2.0MHz)
0768                         ;Only every 4th Interrupt is used to allow a reasonable high
0769                         ;frequency count.At 5 Volt input to the V/F converter the
0770                         ;frequency is 500 kHz.
0771                         ;This gives a max count of 500*4*32.77 = 65,540
0772
0773                         ;A/D converter pulses are counted in PACNT and caccu
0774                         ;-----------------------------------------
0775 S 00B4                  ISR14:
0776 S 00B4 5F                     CLRB
0777 S 00B5 F10107      D          CMPB    plsflg?
0778 S 00B8 271C        S          BEQ     ON1
0779 S 00BA 7A00A0      D          DEC     pON?
0780 S 00BD 2E3E        S          BGT     C1B
0781 S 00BF F70107      D          STAB    plsflg?
0782 S 00C2 F61000                 LDAB    PORTA?
0783 S 00C5 C4F7                   ANDB    #$F7
0784 S 00C7 F71000                 STAB    PORTA?
0785 S 00CA F6001C      E          LDAB    DELcount?
0786 S 00CD F700A0      D          STAB    pON?
0787 S 00D0 F7009F      D          STAB    pOFF?
0788 S 00D3 7E00FD      S          JMP     C1B
0789                         ;-----------------------
0790 S 00D6 F6008B      D ON1:     LDAB    ncnt?
0791 S 00D9 C100                   CMPB    #$0
0792 S 00DB 2720        S          BEQ     C1B
0793 S 00DD 7A009F      D          DEC     pOFF?
0794 S 00E0 261B        S          BNE     C1B
0795 S 00E2 C601                   LDAB    #$1
0796 S 00E4 F70107      D          STAB    plsflg?
0797 S 00E7 F61000                 LDAB    PORTA?
0798 S 00EA C4F7                   ANDB    #$F7
0799 S 00EC CB08                   ADDB    #$8
0800 S 00EE F71000                 STAB    PORTA?
0801 S 00F1 7A008B      D          DEC     ncnt?
0802 S 00F4 F6001C      E          LDAB    DELcount?
```

```
0803 S 00F7 F700A0        D           STAB    pON?
0804 S 00FA F7009F        D           STAB    pOFF?
0805
0806 S 00FD 7A0074        D  C1B:     DEC     i14cnt?
0807 S 0100 2641          S           BNE     C1A              ;act on every 4th interrupt only
0808 S 0102 C604                      LDAB    #4
0809 S 0104 F70074        D           STAB    i14cnt?
0810
0811                           ;adcnt = caccu + (long int)PACNT - (long int)pacntx;
0812 S 0107 0C                        CLC
0813 S 0108 F61027                    LDAB    PACNT?
0814 S 010B F700D4        D           STAB    tempz?
0815 S 010E F00099        D           SUBB    pacntx?
0816 S 0111 2508          S           BCS     B1               ;PACNT-pacntx= negative
0817 S 0113 FB0057        D           ADDB    caccu?+3         ;          positive
0818 S 0116 F70047        D           STAB    adcnt?+3
0819 S 0119 202B          S           BRA     B2
0820
0821
0822                           ;------------------------
0823 S 011B B60057        D  B1:      LDAA    caccu?+3
0824 S 011E 50                        NEGB
0825 S 011F 10                        SBA                      ;subtract B from A
0826 S 0120 B70047        D           STAA    adcnt?+3
0827 S 0123 2421          S           BCC     B2
0828
0829 S 0125 F60056        D           LDAB    caccu?+2
0830 S 0128 C200                      SBCB    #0
0831 S 012A F70046        D           STAB    adcnt?+2
0832 S 012D 241F          S           BCC     B3
0833
0834 S 012F F60055        D           LDAB    caccu?+1
0835 S 0132 C200                      SBCB    #0
0836 S 0134 F70045        D           STAB    adcnt?+1
0837 S 0137 241D          S           BCC     B4
0838
0839 S 0139 F60054        D           LDAB    caccu?
0840 S 013C C200                      SBCB    #0
0841 S 013E F70044        D           STAB    adcnt?
0842 S 0141 201B          S           BRA     B5
0843 S 0143 7E01B1        S  C1A:     JMP     C1
0844                           ;------------------------
0845 S 0146 C600             B2:      LDAB    #0
0846 S 0148 F90056        D           ADCB    caccu?+2
0847 S 014B F70046        D           STAB    adcnt?+2
0848
0849 S 014E C600             B3:      LDAB    #0
0850 S 0150 F90055        D           ADCB    caccu?+1
0851 S 0153 F70045        D           STAB    adcnt?+1
0852
0853 S 0156 C600             B4:      LDAB    #0
0854 S 0158 F90054        D           ADCB    caccu?
0855 S 015B F70044        D           STAB    adcnt?
0856                           ;------------------------
0857
0858                           ;clear caccu? and xfer tempz to pacntx
```

```
0859 S 015E CC0000        B5:     LDD     #0
0860 S 0161 FD0054      D         STD     caccu?
0861 S 0164 FD0056      D         STD     caccu?+2
0862 S 0167 F600D4      D         LDAB    tempz?
0863 S 016A F70099      D         STAB    pacntx?
0864
0865                         ; nrti++;          number of a/d conversions
0866                         ;                  between exec of totalizer prog
0867 S 016D F6008E      D         LDAB    nrti?
0868 S 0170 5C                    INCB
0869 S 0171 F7008E      D         STAB    nrti?
0870 S 0174 C101                  CMPB    #1
0871 S 0176 272D        S         BEQ     C5
0872
0873                         ;adct_s? = adcnt?+adct_s?
0874 S 0178 0C                    CLC
0875 S 0179 F60047      D         LDAB    adcnt?+3
0876 S 017C FB0043      D         ADDB    adct_s?+3
0877 S 017F F70043      D         STAB    adct_s?+3
0878
0879 S 0182 C600                  LDAB    #0
0880 S 0184 F90046      D         ADCB    adcnt?+2
0881 S 0187 F90042      D         ADCB    adct_s?+2
0882 S 018A F70042      D         STAB    adct_s?+2
0883
0884 S 018D C600                  LDAB    #0
0885 S 018F F90045      D         ADCB    adcnt?+1
0886 S 0192 F90041      D         ADCB    adct_s?+1
0887 S 0195 F70041      D         STAB    adct_s?+1
0888
0889 S 0198 C600                  LDAB    #0
0890 S 019A F90044      D         ADCB    adcnt?
0891 S 019D F90040      D         ADCB    adct_s?
0892 S 01A0 F70040      D         STAB    adct_s?
0893 S 01A3 200C        S         BRA     C1
0894
0895                         ;adct_s = adcnt?
0896 S 01A5 FC0044      D C5:     LDD     adcnt?
0897 S 01A8 FD0040      D         STD     adct_s?
0898 S 01AB FC0046      D         LDD     adcnt?+2
0899 S 01AE FD0042      D         STD     adct_s?+2
0900
0901 S 01B1 C640           C1:    LDAB    #$40
0902 S 01B3 F71025                STAB    TFLG2?
0903 S 01B6 3B                    RTI
0904                         ;------------------------------------
0905 S 01B7              ISR15:
```

I claim:

1. Apparatus for integrating a flow proportional signal from a flow rate measuring device subject to zero drift while the flow proportional signal after application of a zero correction determined by a zeroing operation exceeds a first predetermined threshold, said apparatus comprising:

means applying a zero correction to said flow proportional signal;

a first totalizer for accumulating a time integral of said zero corrected flow proportional signal while the threshold is exceeded; and means operative to redetermine said zero correction during a zeroing operation;

wherein said zero correction redetermining means further comprises;

means disabling said first totalizer during said zeroing operation;

a second totalizer operative to accumulate a time integral of said zero corrected flow proportional signal during said zeroing operation;

threshold means to reject said redetermined zero correction if it deviates excessively from a reference; and means responsive to rejection of said redetermined zero correction by said threshold means to add the integral accumulated in said second totalizer during the zeroing operation to said first totalizer.

2. Apparatus according to claim 1, further including a third totalizer operative to accumulate a time integral of the flow proportional signal, means to reset the third totalizer and a timer means upon one of two events, namely the third totalizer accumulating a predetermined total and the timer means timing a predetermined elapsed interval, and means responsive to the timer means timing said predetermined elapsed interval, while the total accumulated by the third totalizer is below a second predetermined threshold, to initiate said zeroing operation.

3. Apparatus according to claim 2, wherein the flow rate measuring device is a belt conveyor weight scale, and the predetermined elapsed interval is that taken for an integral number of complete revolutions of a belt of the conveyor to which the scale is applied.

4. Apparatus according to claim 1, comprising a register operative during a zeroing operation to accumulate samples of said flow proportional signal prior to zero correction, a second register to accumulate a count of said samples, a first timer means to terminate the zeroing operating after a predetermined elapsed interval, and means to calculate a zero correction from an average of the value of said samples.

5. Apparatus according to claim 4, further including a third totalizer operative to accumulate a time integral of the flow proportional signal, means to reset the third totalizer and a second timer means upon one of two events, namely the third totalizer accumulating a predetermined total and the second timer means timing a predetermined elapsed interval, and means responsive to the second timer means timing said predetermined elapsed interval, while the total accumulated by the third totalizer is below a predetermined threshold, to initiate said zeroing operation.

6. Apparatus according to claim 5, wherein the flow rate measuring device is a belt conveyor weight scale, and the predetermined elapsed interval for each timer means is that taken for an integral number of revolutions of a belt of the conveyor to which the scale is applied.

7. Apparatus according to claim 6, wherein the predetermined elapsed interval for the second timer means is that taken for an integral number of revolutions of the belt exceeding the minimum necessary to produce a predetermined increment of the first totalizer, with the zero corrected flow proportional signal just exceeding its first predetermined threshold, said predetermined increment being selected to be indicative of an empty belt.

8. Apparatus according to claim 5, implemented by a microcontroller programmed for repeated execution of a program loop comprising a plurality of subprograms, each subprogram establishing different sequences of operations, including setting of flags according to execution of previously executed programs, and each subprogram including only operations executable using immediately available data, whereby to establish a sequence in which the subprograms can execute repeatedly in time division multiplexed to maintain simultaneous implementation of plural means implemented by the microcontroller including simultaneous functioning of said second totalizer and said zero correction determining means, and simultaneous functioning of said first totalizer and said third totalizer.

9. Apparatus according to claim 1, wherein the flow rate measuring device is a belt conveyor weight scale.

10. Apparatus according to claim 1, implemented by a microcontroller programmed for repeated execution of a program loop comprising a plurality of subprograms, each subprogram establishing different sequences of operations including setting of flags according to conditions of flags set during execution of previously executed subprograms, and each subprogram including only operations executable using immediately available data, whereby to establish a sequence which the subprograms can execute repeatedly in time division multiplex to maintain simultaneous implementation of plural means implemented by the microcontroller including simultaneous functioning of said second totalizer and said zero correction determining means.

* * * * *